Sept. 21, 1965  G. CATES  3,207,028
DISPLAY DEVICE FOR PROJECTING IMAGES FROM SUPERIMPOSED
FRAMED SILHOUETTES ONTO A SCREEN
Filed Sept. 5, 1961  2 Sheets-Sheet 1
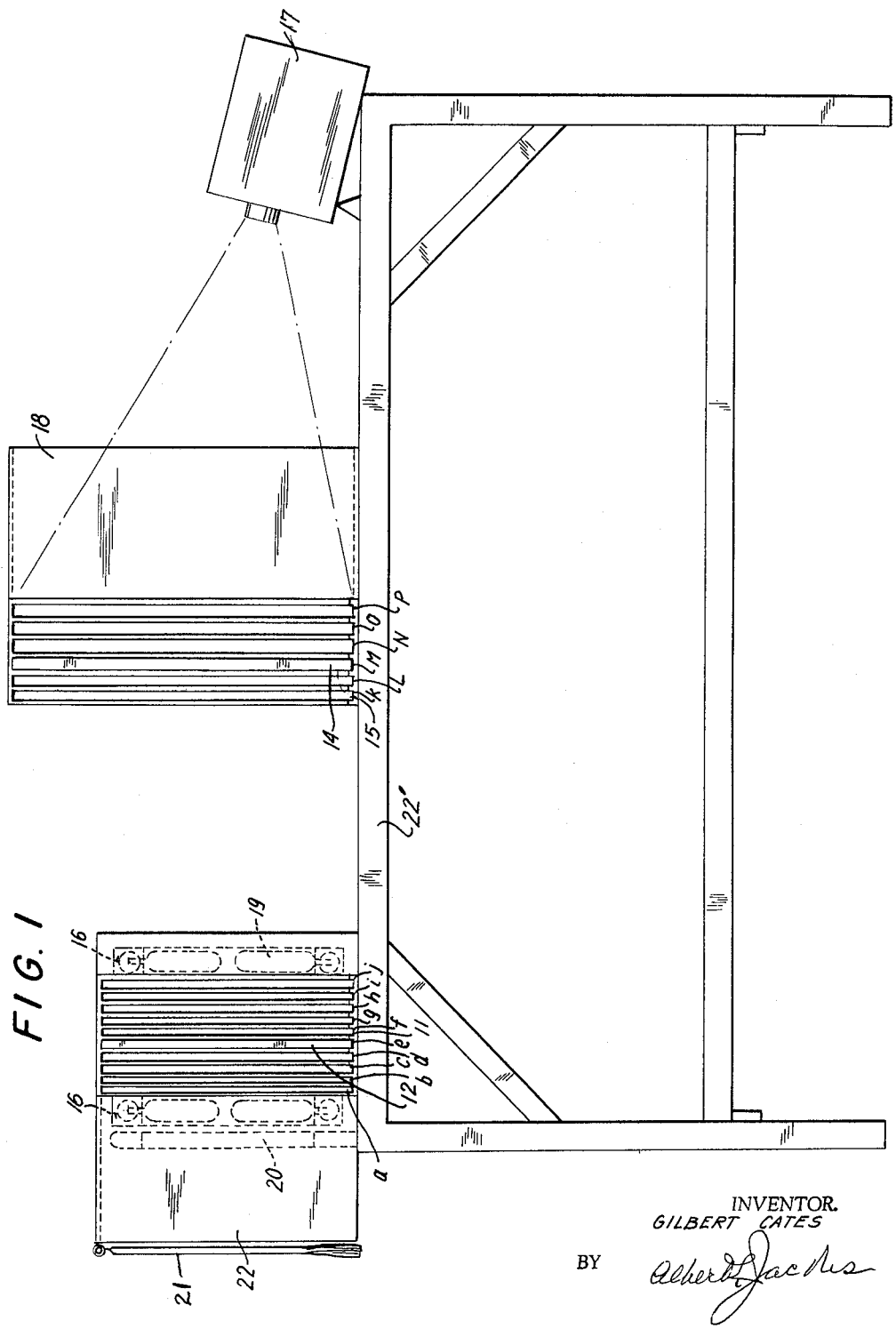
INVENTOR.
GILBERT CATES
BY
Albert Jacobs
ATTORNEY

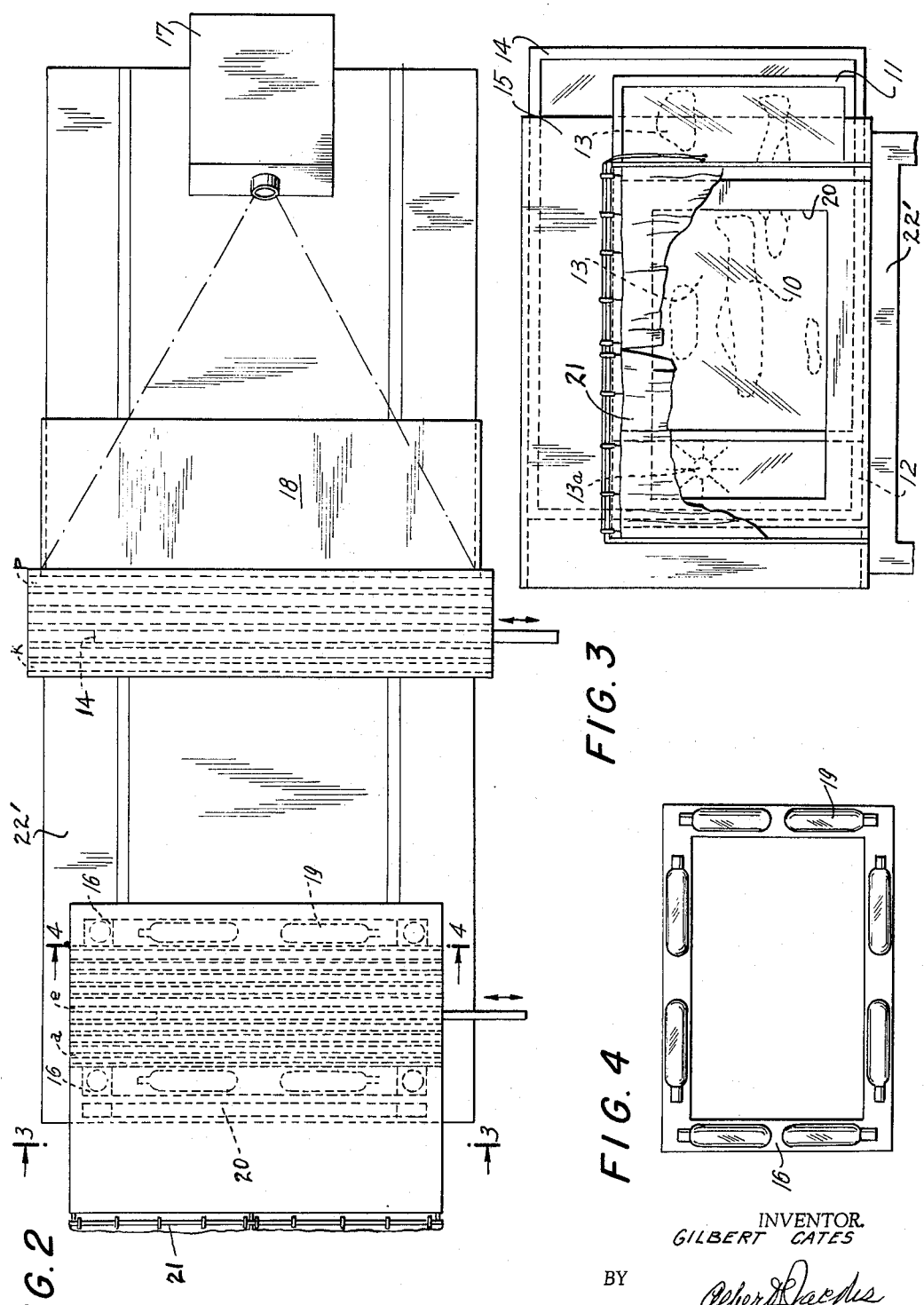

United States Patent Office 3,207,028
Patented Sept. 21, 1965

3,207,028
DISPLAY DEVICE FOR PROJECTING IMAGES FROM SUPERIMPOSED FRAMED SILHOUETTES ONTO A SCREEN
Gilbert Cates, 2550 Independence Ave., Riverdale 63, N.Y.
Filed Sept. 5, 1961, Ser. No. 136,707
11 Claims. (Cl. 88—24)

The present invention is concerned with a device for displaying a vast number of diverse pictorial items singly or in combination to an audience or group either on television, in the movies or through any other visual medium in a real or life-like manner.

Heretofore, it has been necessary to employ a warehouse, separate studio or other similar arrangement to house the vast array of prizes it was desired to show or to award on TV shows. Although the present invention was conceived as a solution to this problem, it has equally appropriate application for the movies and general display purposes.

In more specific terms a display unit or device according to the invention is composed of a hooded foreground area which has an open rectangular front portion. To eliminate any possibility of the displayed items being seen before the appropriate time, a curtain is placed in front of the open portion which is opened or raised when desired. The foreground area itself comprises a plurality of runner-slots (ten being illustrated) which are constructed to receive slidable frames made of wood, plexiglass or other suitable materials on which cut-out silhouettes of the object to be displayed are removably attached either mechanically or as by an adhesive. Both in front of these runner-slots and behind them is a light source consisting of a quadrangular arrangement of eight lights disposed in pairs each of which can be dimmed independently. These lights provide any needed or desired intensity of illumination for the object silhouettes. Behind this foreground area is a background area which is generally similar in construction. Here there are a plurality of runner-slots, in this case six, each constructed to receive slidable frames similar in construction to those used for the foreground area. Thus numerous appropriate backgrounds, removably attached to these background frames, can be slid into an appropriate slot. Behind the background area is a translucent screen which, in turn, has a projector behind it. This projector may be used to create special background effects either through the use of slides which may be projected on the translucent screen or through the use of the projector as an additional light source or both. Thus, independent but cooperating light sources are provided for foreground and background display purposes.

A more detailed and thorough understanding of this invention may be obtained from the following non-limitative example and reference to the drawings.

FIG. 1 is a side elevational view of the display means of the invention.
FIG. 2 is a plan view of FIG. 1.
FIG. 3 is a front view taken along line 3—3 of FIG. 2.
FIG. 4 is a front view taken along line 4—4 of FIG. 2.

A silhouette 10 exemplified by that of an airplane (FIG. 3) is removably attached to slidable frame 11 which is shown partially slid into a foreground runner-slot 12. FIG. 1 shows slidable frame 11 completely slid into runner-slot 12, runner-slot 12 being the fifth of the ten foreground runner-slots designated a–j. An appropriate background silhouette such as sky and clouds 13 and sun 13a is removably attached to background frame 14 which is shown partially slid into background runner-slot 15, the third of six background runner-slots designated k–p. The foreground may be illuminated by light sources 16 which contain suitable means of illumination, such as reflector bulbs 19, arranged in pairs and connected to an electrical circuit of known character by means of which any pair may be dimmed or otherwise varied in amount or intensity of illumination. The background illumination which is physically independent of the foreground illumination is supplied by projector 17 shining light on translucent screen 18. A curtain 21 is placed in front of the open rectangular front portion 20 and may be a drop curtain suspended from the hood of the hooded foreground area 22 or may be a draw curtain which may be attached if desired to the top and sides of the hood of the hooded foreground area but which may optionally be mounted on a rollaway frame. The entire unit may be placed on any suitable supporting surface as that shown at 22'.

Two added and important features of this device are:
(1) The ability to show representations of a variety of different objects or a plurality of the same objects merely by utilizing all ten, or as many as are needed, of the foreground runner-slots and all six, or as many as are needed of the background runner-slots. (2) The ability to superimpose an image onto the object silhouette in such a way that the combination appears to be real or live. For example, this can be done by focusing one television camera on the unit displaying the airplane while another television camera takes a long range image of a live performer in the studio, optically adjusts the image to appropriate size and then superimposes it by known techniques so that the performer appears to the television viewers to be inside the airplane cockpit. Other uses of this device includes effects obtained, for example, by the use of a canoe silhouette, appropriate moving or still background material and the superimposition of a live performer using a paddle so that it would appear to a television or movie audience that this person was actually paddling the canoe and that the canoe was moving relative to the background. Up to now the only way such action could be shown would be to have this performer sit in a model or real canoe with a paddle and have water projected on a screen behind him in such a way as to give the appearance that he was paddling. These are merely examples of the many and varied ways in which this invention provides an easier and more economical means of achieving special and novel display or viewing effects. Many other visual effects and combinations of visual effects can be obtained as will be appreciated from the foregoing.

What is claimed is:
1. A display device comprising a hooded foreground area having an open front portion, a plurality of runner-slots, one behind the other, in said foreground area, a plurality of slidable frames on which object silhouettes are attached receivable in said slots, at least one light source within said foreground area, a background area disposed behind the foreground area, a translucent screen behind the background area and a projector located behind the translucent screen.

2. A device according to claim 1 wherein the light source has two quadrangularly arranged sets of bulbs one of which is placed in front of the first runner-slot and the other behind the last runner-slot to provide illumination for silhouettes placed in any of said runner-slots.

3. A device according to claim 1 wherein each of the frames is quadrangular in configuration with an open inner portion in which said object silhouette is placed, said silhouette being removably attached to any of the frame sides, the frame then being so movable into and through its runner-slot as to render it non-visible.

4. A device according to claim 1 wherein each of said frames is composed of plexiglass quadrangular in configuration and constructed longer than the length of said runner-slots to enable object silhouettes attached thereto to have the appearance of motion by the sliding of the plexiglass from through a runner-slot in a direction transverse of the device.

5. A device according to claim 2 wherein each set of bulbs is disposed in pairs and each grouped pair of lights is individually controllable as to amount of illumination.

6. In a display device, a hooded foreground area having an open rectangular front portion according to claim 1 wherein said open front portion is curtained so that the interior of said foreground area is non-visible until such time as it is desired to exhibit the same to an audience.

7. A device according to claim 1 wherein said background area comprises several runner-slots constructed to receive the slidable frames to which backgrounds are removably attached.

8. A device according to claim 1 wherein the projector may project light as well as slides onto said translucent screen to provide combination lighting and background effects for said object silhouette.

9. A device according to claim 1 wherein at least one object silhouette is removably attached to a slidable frame and the latter placed in an appropriate runner-slot in said foreground area, appropriate illumination of said object silhouette being effected by means of a plurality of light sources, an appropriate background for said object silhouette attached to a slidable frame and placed in an appropriate background runner-slot and any additional light and background supplied by the projection of same by said projector onto said translucent screen located behind the background area.

10. A device according to claim 9 which may be used in conjunction with a television camera as well as any other suitable superimposition device so that a form, animate as well as inanimate, may be superimposed on said object silhouette to appear to be an integral part of the entire display.

11. A display device comprising a hooded foreground area having an open front portion, a plurality of runner-slots, one behind the other, in said foreground area, a plurality of slidable frames on which object silhouettes are attached receivable in said slots, two quadrangularly arranged sets of bulbs one of which is placed in front of the first runner-slot and the other behind the last runner-slot, a background area disposed behind the rearmost quadrangular set of bulbs, a plurality of runner-slots, one behind the other in said background area, a plurality of slidable frames on which backgrounds are attached receivable in said slots, a translucent screen behind the background area and a projector located behind the translucent screen.

References Cited by the Examiner

UNITED STATES PATENTS

| | | |
|---|---|---|
| 636,319 | 11/99 | Camp. |
| 2,105,008 | 1/38 | Riley. |
| 2,116,114 | 5/38 | Guidarossi _____ 88—24 X |
| 2,200,358 | 5/40 | Haskin _____ 88—24 |
| 2,488,955 | 11/49 | Wood _____ 88—24 |
| 2,499,351 | 3/50 | Bretz _____ 88—24 |

LEO SMILOW, *Primary Examiner.*

EMIL G. ANDERSON, *Examiner.*